United States Patent
Mertens

(10) Patent No.: US 11,652,247 B2
(45) Date of Patent: May 16, 2023

(54) ELECTRIC STORED ENERGY SOURCE

(71) Applicant: Bayerische Motoren Werke Aktiengesellschaft, Munich (DE)

(72) Inventor: Thomas Mertens, Moosinning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 16/665,158

(22) Filed: Oct. 28, 2019

(65) Prior Publication Data

US 2020/0058969 A1    Feb. 20, 2020

Related U.S. Application Data

(63) Continuation of application No. PCT/EP2018/060584, filed on Apr. 25, 2018.

(30) Foreign Application Priority Data

May 4, 2017    (DE) ...................... 10 2017 207 553.8

(51) Int. Cl.
*H01M 10/635* (2014.01)
*H01M 10/625* (2014.01)
(Continued)

(52) U.S. Cl.
CPC .......... *H01M 10/635* (2015.04); *B60L 50/64* (2019.02); *B60L 58/26* (2019.02); *B60L 58/27* (2019.02);
(Continued)

(58) Field of Classification Search
CPC ........... B60L 2240/36; B60L 2240/545; B60L 50/64; B60L 58/26; B60L 58/27; H01M 10/486; H01M 10/613; H01M 10/615; H01M 10/625; H01M 10/635; H01M 10/647; H01M 10/654; H01M 10/6556; H01M 10/6567; H01M 2220/20; H01M 10/6566; H01M 10/6565
See application file for complete search history.

(56) References Cited

U.S. PATENT DOCUMENTS 4,007,315 A    2/1977  Brinkmann et al.
4,865,928 A *  9/1989  Richter ............ H01M 10/6556
                                                429/233
(Continued)

FOREIGN PATENT DOCUMENTS

BE    824755 A1    5/1975
CN   1345472 A    4/2002
(Continued)

OTHER PUBLICATIONS

Schmidt et al., Energy Storage Means, Aug. 16, 2012, WIPO machine translation (Year: 2012).*
(Continued)

*Primary Examiner* — Adam A Arciero
(74) *Attorney, Agent, or Firm* — Crowell & Morring LLP

(57) ABSTRACT

An electric stored energy source for a motor vehicle has a housing that defines an inner chamber in which electrochemical components of an energy storage cell are accommodated, and a line extending through the inner chamber and via which a coolant or a heating medium can be guided through the inner chamber.

5 Claims, 1 Drawing Sheet

(51) Int. Cl.
*H01M 10/6556* (2014.01)
*H01M 10/6567* (2014.01)
*B60L 58/27* (2019.01)
*B60L 50/64* (2019.01)
*B60L 58/26* (2019.01)
*H01M 10/48* (2006.01)

(52) U.S. Cl.
CPC ....... *H01M 10/486* (2013.01); *H01M 10/625* (2015.04); *H01M 10/6556* (2015.04); *H01M 10/6567* (2015.04); *B60L 2240/36* (2013.01); *B60L 2240/545* (2013.01); *H01M 2220/20* (2013.01)

(56) References Cited

U.S. PATENT DOCUMENTS

| | | | |
|---|---|---|---|
| 6,689,507 | B1 | 2/2004 | Tsutsumi et al. |
| 2013/0207459 | A1* | 8/2013 | Schroder ................ B60L 50/64 307/10.1 |
| 2015/0064534 | A1 | 3/2015 | Lohmann et al. |
| 2015/0188203 | A1* | 7/2015 | Enomoto .......... H01M 10/6567 429/83 |
| 2016/0141736 | A1 | 5/2016 | Hong et al. |
| 2017/0229745 | A1 | 8/2017 | Oh et al. |

FOREIGN PATENT DOCUMENTS

| | | |
|---|---|---|
| CN | 102569866 A | 7/2012 |
| CN | 203339274 U | 12/2013 |
| CN | 104332648 A | 2/2015 |
| CN | 105580183 A | 5/2016 |
| CN | 105900280 A | 8/2016 |
| DE | 436922 A | 11/1926 |
| DE | 24 14 758 A1 | 10/1975 |
| DE | 296 22 074 U1 | 4/1997 |
| DE | 102 02 807 A1 | 8/2003 |
| DE | 103 58 582 A1 | 7/2005 |
| DE | 10 2011 010 664 A1 | 8/2012 |
| DE | 10 2011 053 439 A1 | 1/2013 |
| EP | 0 310 794 A1 | 4/1989 |
| GB | 2 068 633 A | 8/1981 |
| GB | 2532724 A | 6/2016 |
| JP | 2014-82069 A | 5/2014 |
| KR | 10-2016-0023038 A | 3/2016 |
| WO | WO 2012/107161 A1 | 8/2012 |

OTHER PUBLICATIONS

Schmidt et al., WO 2012/107161; WIPO machine translation, 2012 (Year: 2012).*

International Search Report (PCT/ISA/210) issued in PCT Application No. PCT/EP2018/060584 dated Aug. 6, 2018 with English translation (five (5) pages).

German-language Written Opinion (PCT/ISA/237) issued in PCT Application No. PCT/EP2018/060584 dated Aug. 6, 2018 (eight (8) pages).

German-language Search Report issued in counterpart German Application No. 10 2017 207 553.8 dated Jan. 19, 2018 with partial English translation (13 pages).

Chinese-language Office Action issued in Chinese Application No. 201880011060.X dated Jul. 23, 2021 with English translation (17 pages).

* cited by examiner

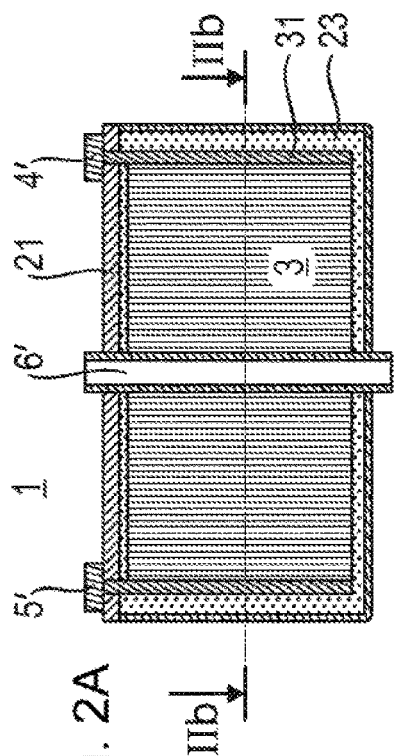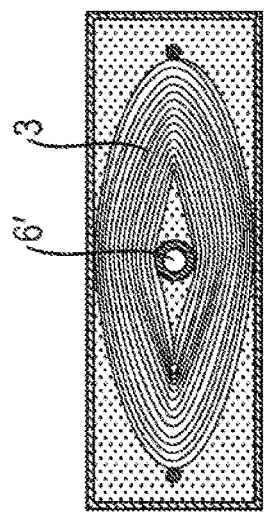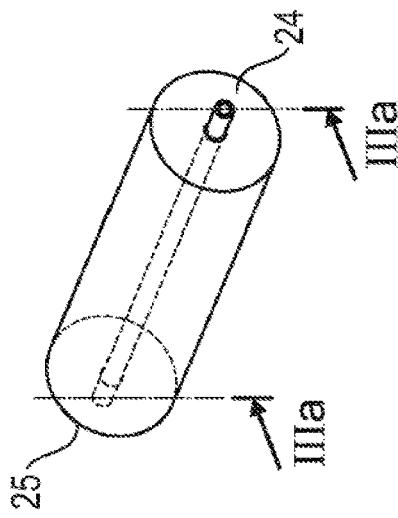
Fig. 2A
Fig. 2B
Fig. 3B
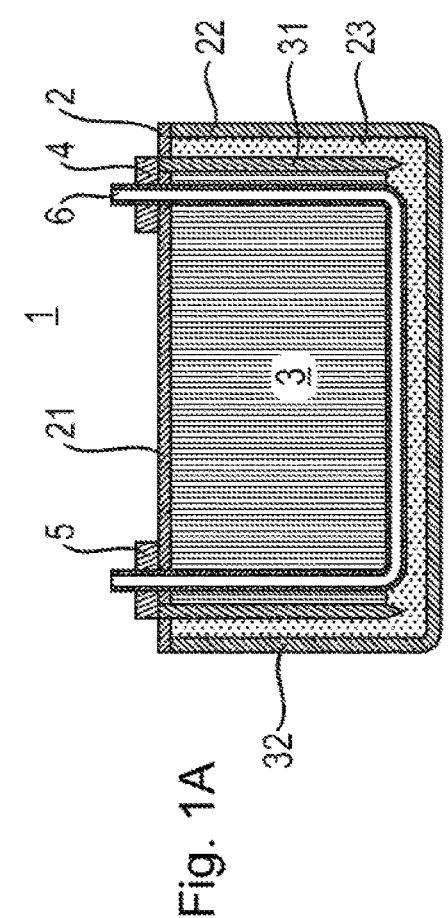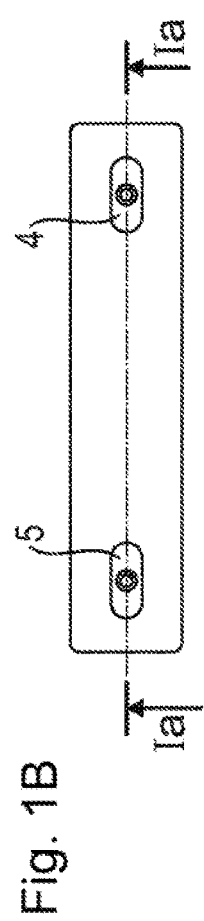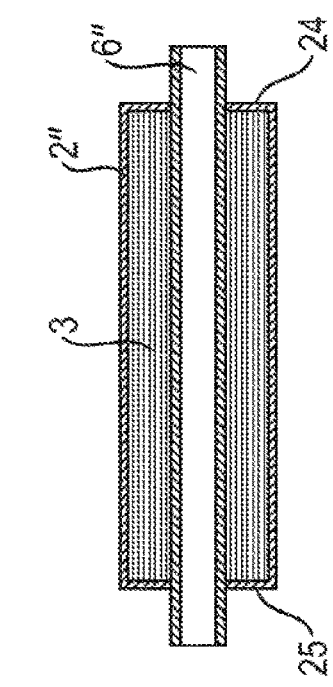
Fig. 1A
Fig. 1B
Fig. 3A

ELECTRIC STORED ENERGY SOURCE

CROSS REFERENCE TO RELATED APPLICATIONS

This application is a continuation of PCT International Application No. PCT/EP2018/060584, filed Apr. 25, 2018, which claims priority under 35 U.S.C. § 119 from German Patent Application No. 10 2017 207 553.8, filed May 4, 2017, the entire disclosures of which are herein expressly incorporated by reference.

BACKGROUND AND SUMMARY OF THE INVENTION

The present invention relates to an electrical energy storage cell for a motor vehicle and to a method for operating an electrical energy storage cell. In particular, the invention relates to such an energy storage cell that is used for supplying electrical power to an electrical drive assembly of a motor vehicle.

Electrical energy storage cells are generally known in the prior art and are used in motor vehicles as part of an electrical energy store for an electric drive assembly.

In order that the energy storage cells of the electrical energy store operate reliably over their lifetime, it is necessary to cool the energy storage cells, for example, during operation of the motor vehicle or, where appropriate, to heat up said energy storage cells in a starting phase.

In order to accomplish this, cooling/heating systems with corresponding cooling/heating elements, which are arranged spatially on an outer side of the energy storage cells or the energy store as a whole, are used in the prior art. Such cooling/heating systems together with their cooling/heating elements take up valuable installation space inside the motor vehicle.

Against this background, it is the object of the present invention to provide an electrical energy storage cell and a corresponding method for operating an energy storage cell that permit optimization of installation space.

In accordance with one aspect of the present invention, an electrical energy storage cell for a motor vehicle contains a housing, which defines an interior, in which electrochemical components of the energy storage cell are held, and a line that runs through the interior and via which a cooling or heating medium can be conducted through the interior.

The electrical energy storage cell according to the invention relates, in particular, to such an energy storage cell that forms part of an electrical energy store for an electric drive assembly of a motor vehicle. Such an energy store is preferably constructed from a multiplicity of storage modules, wherein each of the storage modules, in turn, contains a multiplicity of energy storage cells according to the invention, which are interconnected in a desired configuration.

The electrochemical components are preferably a construction of two electrode strips, which are each electrically connected to a corresponding electrode and isolated from one another by way of a separator. The electrodes are formed, for example, from copper or aluminum and electrically connected to a respective contact-making pole, which is accessible from outside of the electrical energy storage cell for connection of the energy storage cell.

At least the electrode strips and the separator preferably have a wound structure in the interior, said wound structure being obtained by virtue of the electrode strips and the separator being placed on top of one another and rolled together outside of the housing. The wound structure obtained outside of the housing in this manner is then subsequently inserted into the interior of the housing.

The electrical energy storage cell according to the invention is preferably a lithium ion energy storage cell. In this case, one of the electrode strips is a transition metal structure and the other of the electrode strips is a carbon structure, wherein both structures are isolated from one another by way of the separator. Furthermore, the interior of the housing is filled with a nonaqueous electrolyte solution, which makes it possible for the lithium ions to migrate during charging/discharging of the electrical energy storage cell.

According to the invention, the line runs through the interior of the housing of the energy storage cell so that the cooling/heating medium can be conducted through the interior of the energy storage cell. The medium is preferably a cooling liquid. Owing to the inventive arrangement of the line inside the housing, valuable installation space is available outside of the energy storage cell for other components, that is to say according to the invention an optimization of installation space can be achieved.

Furthermore, owing to the inventive arrangement of the line, the cooling/heating medium is conducted to the important area of the energy storage cell, which requires either cooling or heating. This has, for example, positive effects on the lifetime of the energy storage cell and makes it possible to prevent losses of operating range caused by cold conditions.

The electrical energy storage cell according to the invention is preferably designed so that the line runs through the interior in a straight line or in a bent manner.

The line is preferably made of an electrically non-conductive material or a material with poor electrical conductivity. Examples of this are plastics or else, for example, titanium. Particularly preferred are materials having an electrical conductivity of less than or equal to 2.8*106 S/m.

The housing of the electrical energy storage cell according to the invention is preferably a cuboid with a multiplicity of outer faces, which define the cuboid, wherein the line enters the housing at one outer face of the multiplicity of outer faces, runs in the interior and exits the housing again at the outer face.

In other words, the area at which the line enters the housing and the area at which the line exits the housing are located on the same outer face, which is one of the outer faces that define the cuboid. As a result thereof, the cooling/heating system can preferably be connected to one of the outer faces of the cuboid.

Inside the housing, that is to say in the interior, the line preferably runs through the electrochemical components, for example through the mentioned wound structure.

The outer face of the electrical energy storage cell according to the invention is preferably formed by a cover, which closes the housing. This results in advantages in manufacturing, for example.

The housing of the electrical energy storage cell according to the invention is preferably a cuboid with a multiplicity of outer faces, which define the cuboid, wherein the line enters the housing at one outer face of the multiplicity of outer faces, runs in the interior and exits the housing again at a different outer face of the multiplicity of outer faces.

The electrical energy storage cell is preferably designed as explained above, wherein the outer face at which the line enters the housing is formed by a cover, which closes the housing. The line runs through the interior preferably in a straight line and exits the housing again at the other outer face. Said other outer face is the side of the energy storage cell that is opposite the cover and forms the base, for example.

As an alternative, the housing may be a pipe with a first end side and a second end side, wherein the line enters the housing at the first end side, runs in the interior and exits the housing again at the second end side.

In this case, the electrochemical components in the interior likewise preferably form a wound structure, wherein the line runs through the wound structure preferably in a straight line. In other words, the wound structure is wound around the line.

The electrical energy storage cell according to the invention is particularly preferably designed so that the line enters or exits the housing at a first contact-making pole and/or at a second contact-making pole at which the energy storage cell is contact-connected for connection to a load as intended.

The first contact-making pole and the second contact-making pole are connected—so as to penetrate the housing—to the corresponding electrodes by way of corresponding contact-making elements. This is a necessity. The apertures through the housing that are inevitably to be formed here can also be used for laying the line in accordance with the invention. The line runs very particularly preferably through the first and/or second contact-making pole.

The invention furthermore relates to a method for operating an electrical energy storage cell of a motor vehicle, which has the following method steps:
(i) measuring an ambient temperature of the motor vehicle and/or an ambient temperature of the energy storage cell arranged inside the motor vehicle; and
(ii) introducing a medium into an interior of the energy storage cell in which electrochemical components of the energy storage cell are held in order to either heat up or cool the energy storage cell depending on the ambient temperature.

The corresponding energy storage cell is preferably constructed as has been explained in the preceding text.

For the introduction of the medium, for example a liquid, the energy storage cell is connected to a corresponding cooling and/or heating system.

The ambient temperature of the energy storage cell can be measured, for example, by virtue of a temperature sensor being arranged on the energy storage cell.

If the energy store of the motor vehicle contains a multiplicity of energy storage cells, a temperature sensor is preferably arranged on each energy storage cell. In this case, the energy storage cells that make up the energy store are preferably connected in parallel with said cooling and/or heating system via the lines of said energy storage cells, with the result that each of the energy storage cells can be cooled and/or heated individually.

As an alternative, only one of the multiplicity of energy storage cells may be equipped with a temperature sensor, wherein the ambient temperature measured thereby serves as a decision criterion for determining whether all or none of the energy storage cells are cooled or heated up. In this case, the lines of the individual energy storage cells can be connected in series with the cooling and/or heating system.

Furthermore, as an alternative, the ambient temperature of the motor vehicle can also be used for the decision as to whether the energy storage cell or cells is or are cooled or heated. In this case, it is not necessary to equip the energy storage cell or cells with a temperature sensor.

In the method, the temperature to which the energy storage cell or cells are cooled or heated can be adjusted.

The ambient temperature from which heating of the energy storage cell begins is preferably lower than 10° C., preferably 0° C. This applies to all variants of the measurement of the ambient temperature, that is to say at one of the energy storage cells, at each of the energy storage cells or only in the surroundings of the motor vehicle.

The ambient temperature from which cooling of the energy storage cell begins is preferably between 18° C. and 22° C., preferably 20° C. This applies to all variants of the measurement of the ambient temperature, that is to say at one of the energy storage cells, at each of the energy storage cells or only in the surroundings of the motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A and 1B show a first preferred embodiment of an energy storage cell according to the invention, wherein FIG. 1A illustrates a sectional view along a sectional line 1*a*-1*a* shown in FIG. 1B;

FIGS. 2A and 2B show a second preferred embodiment of an energy storage cell according to the invention, wherein FIG. 2B illustrates a sectional view along a sectional line 2A-2A shown in FIG. 2B;

FIGS. 3A and 3B show a third preferred embodiment of an energy storage cell according to the invention, wherein FIG. 3A illustrates a sectional view along a sectional plane 3*a*-3*a* shown in FIG. 3B.

DETAILED DESCRIPTION OF THE DRAWINGS

FIGS. 1A and 1B show a first preferred embodiment of an energy storage cell 1 according to the invention, wherein said energy storage cell has a housing 2.

The housing 2 preferably comprises a cover 21 and a housing container 22, which is closed by the cover 21. The cover 21 and/or the housing container 22 may be made from a metal or a plastic.

The housing 2 defines an interior 23, in which electrochemical components of the energy storage cell 1 according to the invention are held.

The energy storage cell is preferably a lithium ion energy storage cell and contains a first electrode strip (transition metal structure) and a second electrode strip (carbon structures), wherein the two electrode strips are isolated from one another by way of a separator. The two electrode strips are wound together with the separator to form a wound structure 3 and are each electrically connected to an electrode 31, 32.

Furthermore, the interior of the housing 2 is filled with a nonaqueous electrolyte solution, which makes it possible for the lithium ions to migrate during charging/discharging of the electrical energy storage cell.

The housing 2 is formed overall as a cuboid, wherein the cover 21 forms an outer face of a multiplicity of outer faces that define the cuboid.

On the outer face formed by the cover 21 sit a first contact-making pole 4 and a second contact-making pole 5 at which the energy storage cell 1 according to the invention is contact-connected or connected as intended. If the cover is made from a metal, the first contact-making pole 4 and the second contact-making pole 5 are secured to the cover with the interposition of isolators and are each electrically connected through to the electrodes 31, 32 by way of corresponding passages.

According to the invention, a line 6 pierces through the first contact-making pole 4, runs in the interior 3 in a straight line up to a side opposite the cover 21, from there along the opposite side, and, from a certain point, back in a straight line in the direction of the cover 21, where it likewise pierces through the second contact-making pole 5 and leads to the outside. The course is selected in this embodiment so that the line 6 runs in the interior 23 on an outer surface of the wound structure 3 and not through it.

The course of the line 6 in the interior 23 could also be different.

The line 6 is preferably made of an electrically isolating material or at least of a material with poor electrical conductivity, such as titanium, for example.

FIG. 1B shows that the line 6 pierces in each case through the center of the first contact-making pole 4 and the second contact-making pole 5.

The line 6 can be connected to a cooling and/or heating system (not shown) as intended such that a liquid can pump through the line 6 for the purpose of cooling/heating the energy storage cell 1.

Owing to the inventive arrangement of the line 6, installation space outside of the energy storage cell 1 can be saved and at the same time the area where it is necessary can be cooled or heated very well.

FIGS. 2A and 2B show a second preferred embodiment of an energy storage cell 1' according to the invention. Such elements that are identical to those of the first preferred embodiment have the same reference signs and are not explained again.

The second preferred embodiment differs from the first in particular in the design of the line 6', which, as shown in FIG. 2, pierces through the center of the cover 21 and runs in a straight line to a side opposite the cover 21, where it in turn pierces through the housing 2 and leads to the outside.

As can be seen in the corresponding figure, the line 6' does not pierce through any of the contact-making poles 4', 5', which therefore do not have any openings and are contact-connected to the respective electrodes by way of a very small aperture in the cover 21.

FIG. 2B furthermore shows that in said second preferred embodiment the line 6' runs through the wound structure 3.

FIGS. 3A and 3B show a third preferred embodiment of an electrical energy storage cell 1" according to the invention. Such elements that are identical to those of the first and second preferred embodiment again have the same reference signs and are not explained again.

The essential difference of the third preferred embodiment consists in the shape of the housing 2", which, as shown in FIG. 3, is designed as a pipe. The electrochemical components 3 are in this preferred embodiment likewise designed as a wound structure, so that they are inserted into the pipe in a flush manner.

In this preferred embodiment, the line 6 will likewise pass through the center of the wound structure 3, wherein the line 6" enters the pipe at a first end side 24 and exits the pipe at a second end side 25.

In all of the preferred embodiments, the respective line can be connected to the already mentioned cooling and/or heating system in such a way that a liquid can be pumped through the line for cooling/heating the energy storage cell. A corresponding method for operating the energy storage cells mentioned can be carried out depending on the ambient temperature of the corresponding energy storage cell.

The ambient temperature is preferably detected by a temperature sensor (not shown), which is arranged, for example, on the cover 21 or the pipe.

Depending on the level of the measured ambient temperature, a decision can be made as to whether the corresponding energy storage cell is to be cooled or heated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical energy storage cell, comprising:
   two poles;
   a housing, which defines an interior of the housing, in which electrochemical components of the electrical energy storage cell of a motor vehicle are held; and
   a line that runs through the interior of the housing and via which a cooling or heating medium, wherein
   the housing has a multiplicity of outer faces,
   the line is conductible through the interior of the housing adjacent to the outer faces,
   the multiplicity of outer faces define a cuboid,
   the two poles are on the same outer surface, and
   the electrochemical components wrap around the line.

2. The electrical energy storage cell according to claim 1, wherein
   the line runs through the interior in a straight line or in a bent manner.

3. The electrical energy storage cell according to claim 1, wherein
   the line is made of an electrically non-conductive material or a material with an electrical conductivity lower than $2.8*10^6$ S/m.

4. The electrical energy storage cell according to claim 1, wherein
   the one outer face is formed by a cover, which closes the housing.

5. The electrical energy storage cell according to claim 1, wherein
   the outer face at which the line enters the housing is formed by a cover, which closes the housing.

* * * * *